United States Patent
Mendez

(10) Patent No.: US 7,946,619 B2
(45) Date of Patent: May 24, 2011

(54) AIRBAG

(75) Inventor: Gerardo Mendez, Rochester Hills, MI (US)

(73) Assignee: TK Holdings Inc., Auburn Hills, MI (US)

(*) Notice: Subject to any disclaimer, the term of this patent is extended or adjusted under 35 U.S.C. 154(b) by 74 days.

(21) Appl. No.: 12/078,927

(22) Filed: Apr. 8, 2008

(65) Prior Publication Data

US 2009/0194981 A1    Aug. 6, 2009

Related U.S. Application Data

(60) Provisional application No. 61/006,784, filed on Jan. 31, 2008, provisional application No. 61/064,285, filed on Feb. 26, 2008.

(51) Int. Cl.
B60R 21/16 (2006.01)

(52) U.S. Cl. .................................................. 280/743.1

(58) Field of Classification Search .............. 280/730.1, 280/743.1, 743.2
See application file for complete search history.

(56) References Cited

U.S. PATENT DOCUMENTS

| | | | | |
|---|---|---|---|---|
| 5,362,101 A * | 11/1994 | Sugiura et al. | ............. | 280/743.2 |
| 6,883,832 B2 * | 4/2005 | Keutz | ............. | 280/743.2 |
| 7,000,943 B2 * | 2/2006 | Hasebe et al. | ............. | 280/729 |
| 7,121,584 B2 * | 10/2006 | Hasebe et al. | ............. | 280/743.2 |
| 7,131,664 B1 * | 11/2006 | Pang et al. | ............. | 280/743.2 |
| 7,192,053 B2 * | 3/2007 | Thomas | ............. | 280/739 |
| 7,243,947 B2 | 7/2007 | Bosch | | |
| 7,255,367 B2 * | 8/2007 | Bauer et al. | ............. | 280/743.1 |
| 7,316,416 B2 * | 1/2008 | Hasebe et al. | ............. | 280/729 |
| 7,396,043 B2 * | 7/2008 | Choi et al. | ............. | 280/743.1 |
| 7,458,605 B2 * | 12/2008 | Hasebe et al. | ............. | 280/729 |
| 7,484,757 B2 * | 2/2009 | Thomas et al. | ............. | 280/743.2 |
| 7,540,534 B2 * | 6/2009 | Hasebe et al. | ............. | 280/743.1 |
| 7,584,994 B2 * | 9/2009 | Narimoto et al. | ............. | 280/743.1 |
| 7,607,683 B2 * | 10/2009 | Fischer et al. | ............. | 280/730.1 |
| 7,654,568 B2 * | 2/2010 | Yamada | ............. | 280/743.1 |
| 7,712,769 B2 * | 5/2010 | Hasebe et al. | ............. | 280/729 |
| 2003/0218325 A1 * | 11/2003 | Hasebe et al. | ............. | 280/743.2 |
| 2004/0160048 A1 * | 8/2004 | Hasebe et al. | ............. | 280/743.1 |
| 2004/0164526 A1 * | 8/2004 | Hasebe et al. | ............. | 280/729 |
| 2004/0232681 A1 * | 11/2004 | Adomeit | ............. | 280/743.1 |
| 2005/0212275 A1 * | 9/2005 | Hasebe | ............. | 280/743.1 |
| 2006/0066089 A1 * | 3/2006 | Hasebe et al. | ............. | 280/743.1 |
| 2006/0186647 A1 * | 8/2006 | Bosch | ............. | 280/729 |
| 2007/0108753 A1 * | 5/2007 | Pang et al. | ............. | 280/743.2 |
| 2008/0054613 A1 * | 3/2008 | Narimoto et al. | ............. | 280/743.1 |
| 2008/0061536 A1 * | 3/2008 | Hasebe et al. | ............. | 280/729 |

* cited by examiner

*Primary Examiner* — Paul N Dickson
*Assistant Examiner* — Robert A Coker
(74) *Attorney, Agent, or Firm* — Foley & Lardner LLP

(57) ABSTRACT

An occupant protection apparatus for protecting a front seat passenger of a vehicle. The apparatus includes an airbag module configured to be mounted in a instrument panel of a vehicle in front of the front seat passenger. The module includes an airbag and a gas generator. The airbag includes left and right inflatable lobes separated by a central gap. Each of the inflatable lobes is bounded by an outer panel forming an outer surface of the lobe and an inner panel forming an inner surface of the lobe.

11 Claims, 7 Drawing Sheets

AIRBAG

CROSS REFERENCE TO RELATED APPLICATIONS

The present application claims the benefit of and priority to U.S. Provisional Patent Application Nos. 61/064,285 and 61/006,784 filed Feb. 26, 2008 and Jan. 31, 2008, respectively. The foregoing provisional applications are incorporated by reference herein in their entireties.

BACKGROUND

The present application relates generally to the field of airbag use in automotive vehicles. More specifically, the application relates to the use of an improved bi-lobular or twin lobe airbag geometry to simplify its manufacturability and reduce cost without compromising its ability to mitigate or eliminate occupant injury during a dynamic impact event.

A twin lobe airbag utilizing a crescent shaped or C-shaped geometry for use on the lateral inboard panels is shown and described in U.S. Pat. No. 7,243,947 filed May 25, 2005, the entire disclosure of which is incorporated herein for reference. This crescent shaped geometry disclosed in the patent presents challenges in manufacturing. It should be noted that the airbag disclosed herein may be assembled and arranged in substantially the same manner as the airbag disclosed in U.S. Pat. No. 7,243,947 with the exception of the shape and geometry of the panels, which is different for the airbag of the present application as described further below.

It would be advantageous for an airbag design to provide the safety benefits of a twin lobe design with an improved panel geometry and design which would be more efficient in terms of material usage and required processing (e.g. sewing, material handling), thereby reducing cost and the frequency of quality issues.

SUMMARY

According to an exemplary disclosed embodiment an occupant protection apparatus is provided. The apparatus includes an airbag having left and right inflatable lobes separated by a central gap. Each of the inflatable lobes is bounded by an outer panel forming an outer surface of the lobe and an inner panel forming an inner surface of the lobe. The inner panels face each other and define the sides of central gap, and each of the inner panels is D-shaped. According to an alternative embodiment each of the inner panels may be oblong-shaped.

According to an alternative disclosed embodiment an occupant protection apparatus is provided. The apparatus includes an airbag having left and right inflatable lobes separated by a central gap. Each of the inflatable lobes is bounded by an outer panel forming an outer surface of the lobe and an inner panel forming an inner surface of the lobe. The inner panels face each other and define the sides of central gap. The airbag includes an internal lateral tether extending across one of the left and right inflatable lobes between the inner and outer panels. Additionally, or alternatively, the airbag may include a substantially vertical tether positioned in the airbag between the gap and a gas generator for filling the airbag.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
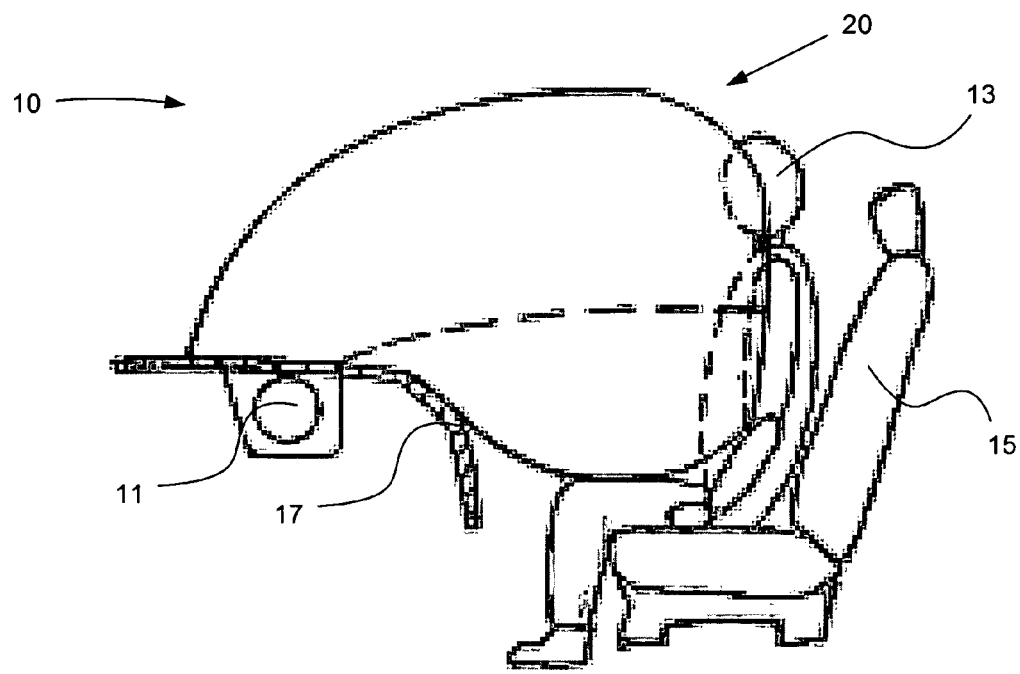
FIG. 1 is a side view of an exemplary embodiment of a vehicle illustrating deployment of an exemplary embodiment of an airbag.

One exemplary embodiment of an airbag incorporates the coupling of multiple lateral inboard panels, multiple lateral outboard panels, and one or more central panels to form a bi-lobular shaped inflated airbag. The panels may be individual pieces or a combination of multiple components joined by processing (e.g. sewing, bonding, welding) made of known airbag fabric material (e.g. nylon, polyester weave) which may be coated by some other material, (e.g. silicone rubber, polyolefin) which may be useful in containing inflating gases inside the airbag. The bi-lobular designed cushion, when inflated, mitigates occupant injury during dynamic impact, by distributing impact forces across the ribs and shoulders of the occupant rather than concentrating them on the sternum. Additionally, a concave region in the lower section of the cushion, and formed from the gap between the two lobes of the cushion also reduces loads exerted onto the head and neck of an out of position occupant. The airbag is in fluid communication with a gas generator. When initiated by a signal from a crash sensor, which responds to the deceleration resulting from a deployable vehicle crash event, the gas generator generates gas. The gas then flows into the folded cushion which inflates and expands, rupturing the airbag cover and allowing the cushion to extend and inflate into the vehicle interior in between the instrument panel and the occupant and providing protection to the occupant.

Within the exemplary embodiment of an airbag, the geometry of the lateral inboard panels may be configured in a D-shape manner. This creates a concave region in between the lower lobe sections of the cushion. This concave region reduces the forces exerted on a small out of position occupant, while preserving beneficial energy absorption to naturally seated occupants during a dynamic impact event. Additionally, this D-shaped configuration provides manufacturing advantages over previous art. For example, this D-shaped configuration of the lateral inboard panels uses less material, which reduces the length of stitching required (which in turn reduces cost to manufacture and time to manufacture), reduces the manufacturing footprint required (i.e. smaller panel means smaller processing area required), and reduces the size of the manufacturing equipment required (e.g. sewing machine). To accommodate the lateral inboard panel geometry change and still provide the central gap used to mitigate potential injury to an out of position occupant during deployment, the central panel has been modified to contain an extension on both sides of one end of the panel.

An exemplary embodiment of an airbag may incorporate the coupling of multiple lateral inboard panels, multiple lateral outboard panels, one or more central panels, and one or more tethers to form a bi-lobular shaped inflated airbag. This exemplary embodiment utilizes the bi-lobular design when inflated and incorporates the use of tethers for additional support so that during inflation the airbag takes and maintains the proper shape. Tethers are extremely useful for restricting the volume of certain sections or locations of the airbag to aid proper deployment. Tethers are also useful on bi-lobular designs to help maintain the pocket or gap located between the lateral inboard panels during deployment, which mitigates injury to out of position occupants or smaller occupants, such as children. The tethers may be positioned on the airbag externally or internally, and may run from front to rear, bottom to top, cross car (i.e. side to side), or may be utilized in other useful positions and locations.

An alternative embodiment of an airbag may include the geometry of the lateral inboard panels to be configured in an oblong-shaped manner. An alternative embodiment still produces an airbag with a bi-lobular design. An alternative embodiment may include one or more than one tether, to provide support during deployment and to maintain proper shape to mitigate damage to occupants during a dynamic crash event.

Referring to FIG. 1, an exemplary embodiment of vehicle 10, comprising, gas generator 11, occupant 13, seat system 15, vehicle dash board 17, and airbag 20 is illustrated. Airbag 20 is illustrated in an inflated condition. Gas generator 11 produces the gas that inflates air bag 20 during deployment in the event of a dynamic impact of vehicle 10.

Figure 2:
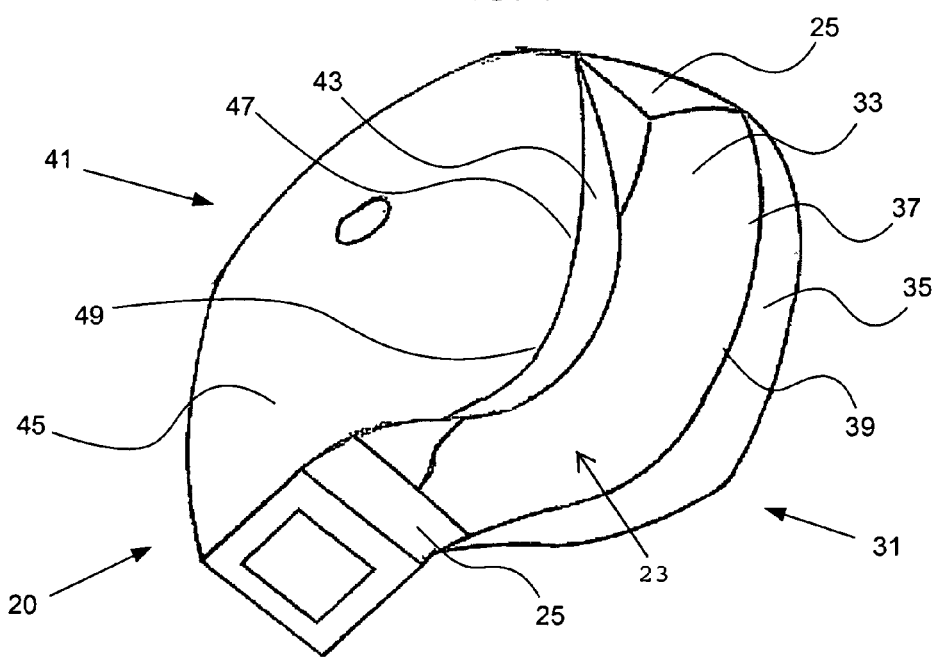
FIG. 2 is a perspective view of an exemplary embodiment of a deployed airbag.

Referring to FIG. 2, a perspective view of an exemplary embodiment of airbag 20 is illustrated in an inflated condition. Airbag 20 comprises, central gap 23, central panel 25, second airbag cushion portion 31 (or right inflatable lobe 31), and first airbag cushion portion 41 (or left inflatable lobe 41). An exemplary embodiment of airbag 20 is constructed to position central gap 23 between first airbag cushion portion 41 and second airbag cushion portion 31, to allow occupant 13 to fill central gap 23 during deployment of airbag 20.

Also referring to FIG. 2, second airbag cushion 31 comprises, second lateral inboard panel 33, second lateral outboard panel 35, remaining edge of second lateral inboard panel 37, and remaining edge of second lateral outboard panel 39. Second airbag cushion 31 may be constructed such that remaining edge of second lateral inboard panel 37 is coupled to remaining edge of second lateral outboard panel 39, joining second lateral inboard panel 33 to second lateral outboard panel 35. First airbag cushion 41 comprises, first lateral inboard panel 43, first lateral outboard panel 45, remaining edge of first lateral inboard panel 47, and remaining edge of first lateral outboard panel 49. First airbag cushion 41 may be constructed such that remaining edge of first lateral inboard panel 47 is coupled to remaining edge of first lateral outboard panel 49, joining first lateral inboard panel 43 to first lateral outboard panel 45. Central panel 25 may be coupled to both first airbag cushion 41 and second airbag cushion 31. Second lateral inboard panel 33 is coupled to first lateral inboard panel 43. The term "coupled" can mean either a joining of separate pieces by a separate operation, or portions of a continuous piece of airbag material, by a manufacturing process (e.g. sewing, bonding, or welding).

Figure 3:
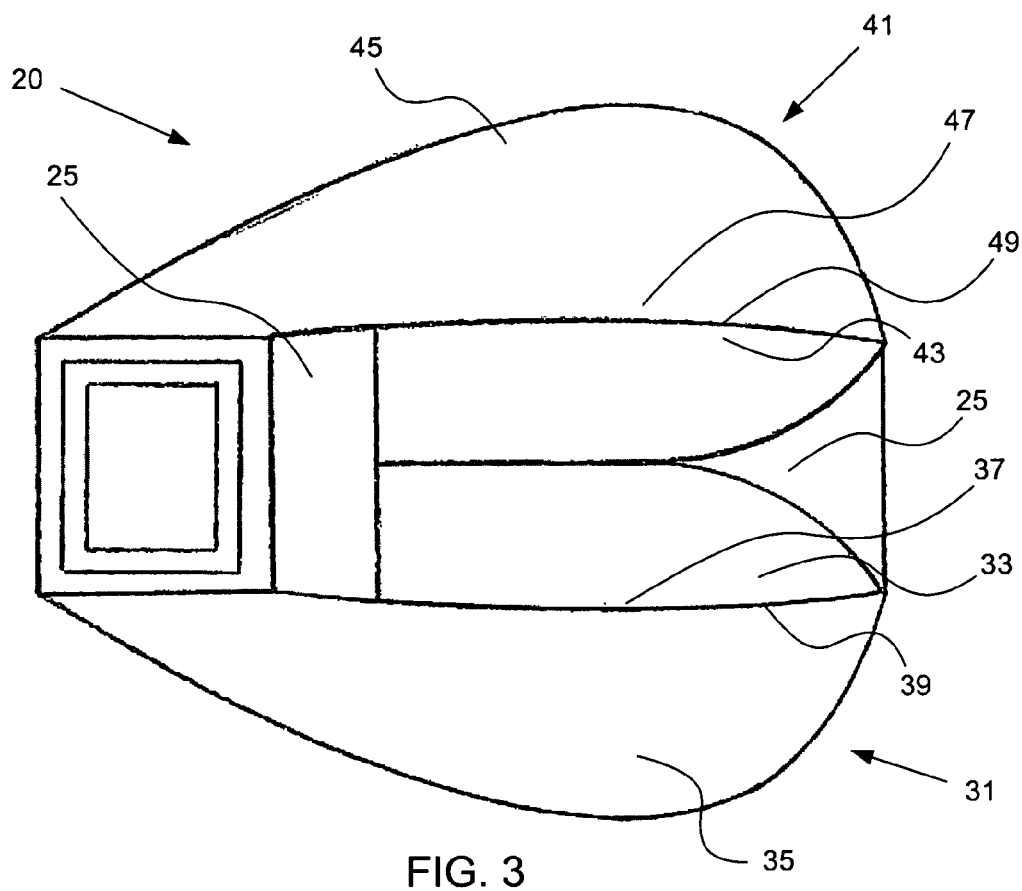
FIG. 3 is a bottom view of an exemplary embodiment of a deployed airbag.

Referring to FIG. 3, a bottom view of an exemplary embodiment of airbag 20 is illustrated in an inflated condition. First lateral inboard panel 43 is coupled to both first lateral outboard panel 45 and central panel 25, forming first airbag cushion 41. Second lateral inboard panel 33 is coupled to both first lateral outboard panel 35 and central panel 25, forming second airbag cushion 31. Additionally, second lateral inboard panel 33 is coupled to first lateral inboard panel 43. Together, first airbag cushion 41 and second airbag cushion 31, create the twin-lobular or bi-lobular design of airbag 20.

Figure 4:
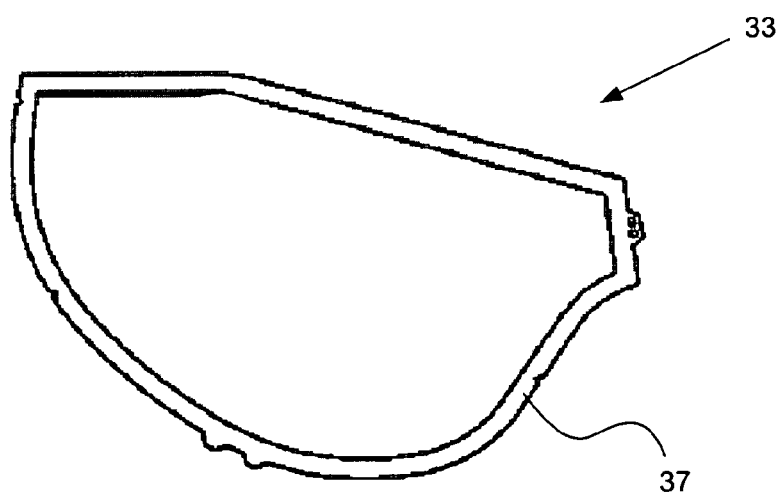
FIG. 4 is a side view of the first generally D-shaped lateral inboard panel, used for constructing an exemplary embodiment of an airbag.

Referring to FIG. 4, a side view of an exemplary embodiment of second lateral inboard panel 33. An exemplary geometry of second lateral inboard panel 33 is D-shaped and includes remaining edge of second lateral inboard panel 37 for joining second lateral inboard panel 33 to second lateral outboard panel 35, central panel 25, and first lateral inboard panel 43.

Figure 5:
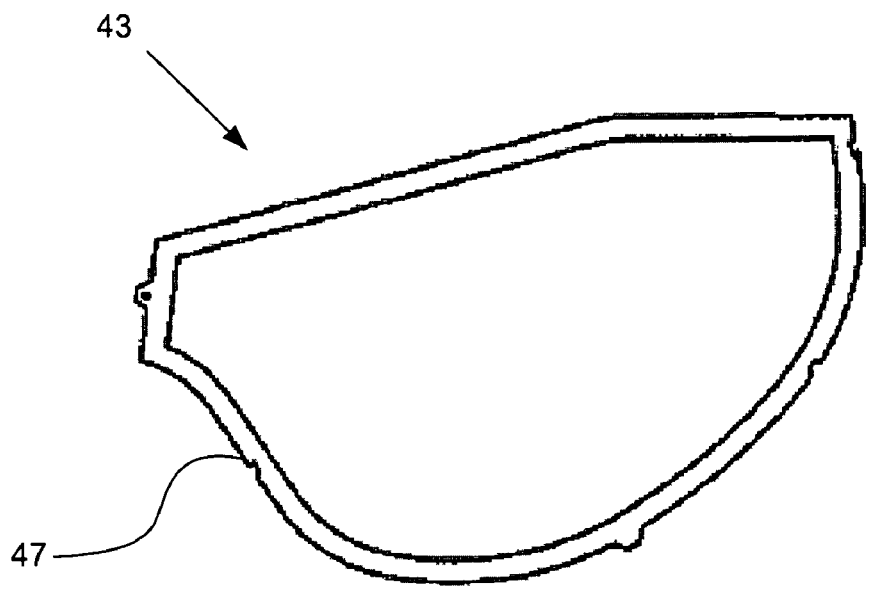
FIG. 5 is a side view of the second generally D-shaped lateral inboard panel, used for constructing an exemplary embodiment of an airbag.

Referring to FIG. 5, a side view of an exemplary embodiment of first lateral inboard panel 43. An exemplary geometry of first lateral inboard panel 43 is D-shaped and includes remaining edge of first lateral inboard panel 47 for joining first lateral inboard panel 43 to first lateral outboard panel 45, central panel 25, and second lateral inboard panel 33.

Also referring to FIGS. 4 and 5, the D-shaped geometry of second lateral inboard panel 33 and first lateral inboard panel 43 create a concave region in between the lower section of first airbag cushion portion 41 and the lower section of second airbag cushion portion 31. This concave region reduces the forces exerted on a small out of position occupant, while preserving beneficial energy absorption to naturally seated occupant 13 during a dynamic impact event. Additionally, this D-shaped configuration provides manufacturing advantages over previous art. For example, this D-shaped configuration of first lateral inboard panel 43 and second lateral inboard panel 33 uses less material, which reduces the length of stitching required, which in turn reduces cost to manufacture and time to manufacture, reduces the manufacturing footprint required (i.e. smaller panel means smaller processing area required), and reduces the size of the manufacturing equipment required (e.g. sewing machine). To accommodate the D-shape of both lateral inboard panels and still provide the central gap used to mitigate potential injury to an out of position occupant during deployment, the central panel may be modified to contain an extension on both sides of one end of the panel.

Figure 6:
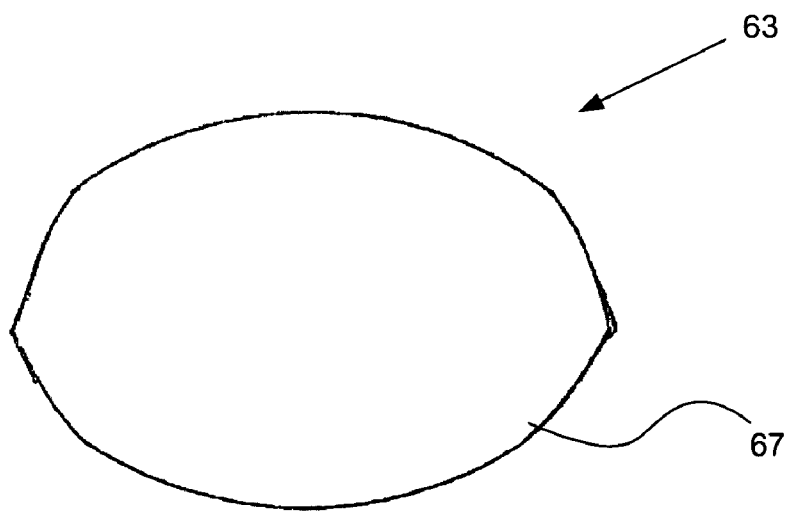
FIG. 6 is a side view of the first generally oblong-shaped lateral inboard panel, used for constructing an alternative embodiment of an airbag.

Referring to FIG. 6, a side view of an alternative embodiment of second lateral inboard panel 63. An exemplary geometry of second lateral inboard panel 63 is oblong-shaped and includes remaining edge of second lateral inboard panel 67 for joining second lateral inboard panel 63 to both second lateral outboard panel 351 and central panel 251.

Figure 7:
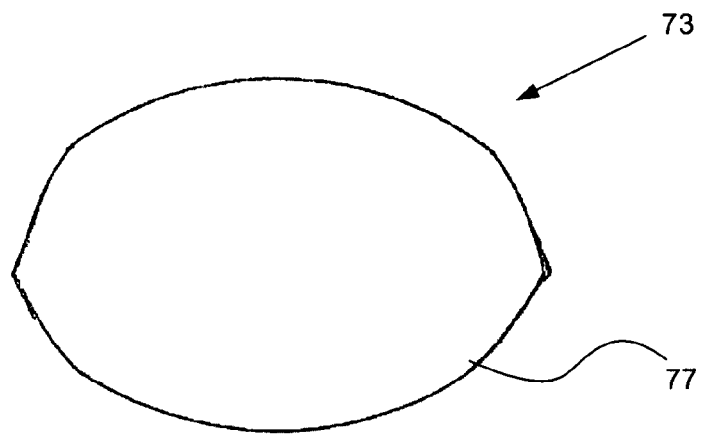
FIG. 7 is a side view of the second generally oblong-shaped lateral inboard panel, used for constructing an alternative embodiment of an airbag.

Referring to FIG. 7, a side view of an alternative embodiment of first lateral inboard panel 73. An exemplary geometry of first lateral inboard panel 73 is oblong-shaped and includes remaining edge of first lateral inboard panel 77 for joining first lateral inboard panel 73 to both first lateral outboard panel 451 and central panel 251.

Figure 8:
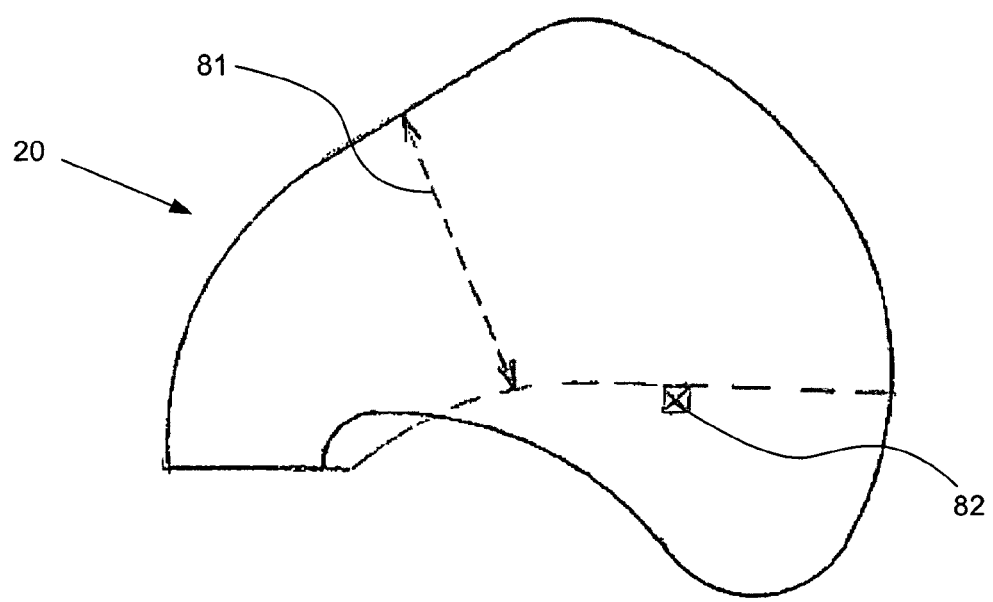
FIG. 8 is a side view of an exemplary embodiment of a deployed airbag.

Referring to FIG. 8, a side view of an exemplary embodiment of airbag 20 is illustrated in an inflated condition. An exemplary embodiment of airbag 20 is constructed using D-shaped geometry for both first lateral inboard panel 43 and second lateral inboard panel 33 and may include the use of vertical tether 81, and may include the use of horizontal tether 82 in two locations. Vertical tether 81, positioned between the base of the gap and the top of the airbag, provides additional support so that during inflation the base of the gap is restrained and airbag 20 takes and maintains the proper shape for improved deployment, especially in situations involving a rear facing infant seat (rfis) and an out of position occupant (oop). Horizontal tether 82 supports the lobe during inflation. Vertical tether 81 and horizontal tether 82 may provide support to aid proper deployment by restricting the volume of certain sections or locations of airbag 20. A tether may also be used on bi-lobular designs to help maintain the pocket or gap, located between first lateral inboard panel 43 and second lateral inboard panel 33, during deployment, which mitigates injury to out of position occupants or smaller occupants, such as children. An alternative embodiment of airbag 20 may be constructed with zero or more than zero tethers. An alternative embodiment of airbag 20 may be constructed with tethers being internal or external to airbag 20.

Figure 9:
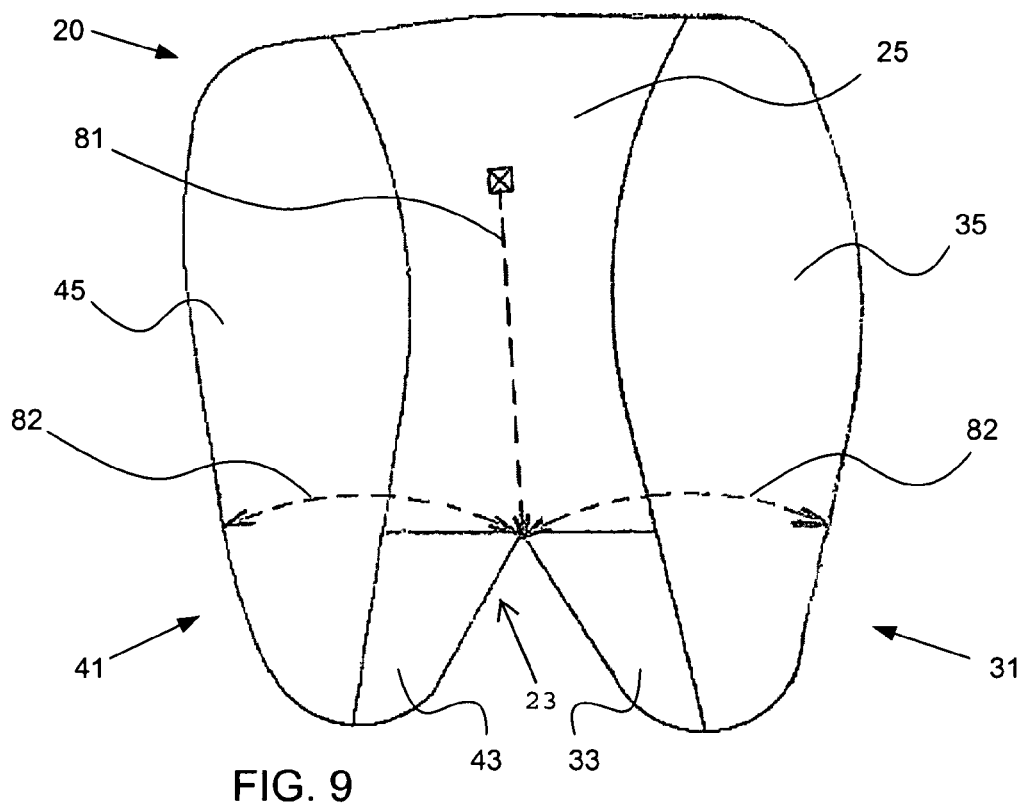
FIG. 9 is a front view of an exemplary embodiment of a deployed airbag.

Referring to FIG. 9, a front view of an exemplary embodiment of airbag 20 is illustrated in an inflated condition. An exemplary embodiment of airbag 20 may include the use of vertical tether 81, positioned in the airbag between the base of the gap and the top of the airbag. An exemplary airbag 20 may also include horizontal tether 82 in two locations, one positioned in right inflatable lobe 31 between inner panel 33 and outer panel 35, the other positioned in left inflatable lobe 41 between inner panel 43 and outer panel 45. An alternative embodiment of airbag 20 may be constructed with zero or more than zero tethers. An alternative embodiment of airbag 20 may be constructed with tethers being internal or external to airbag 20.

Figure 10:
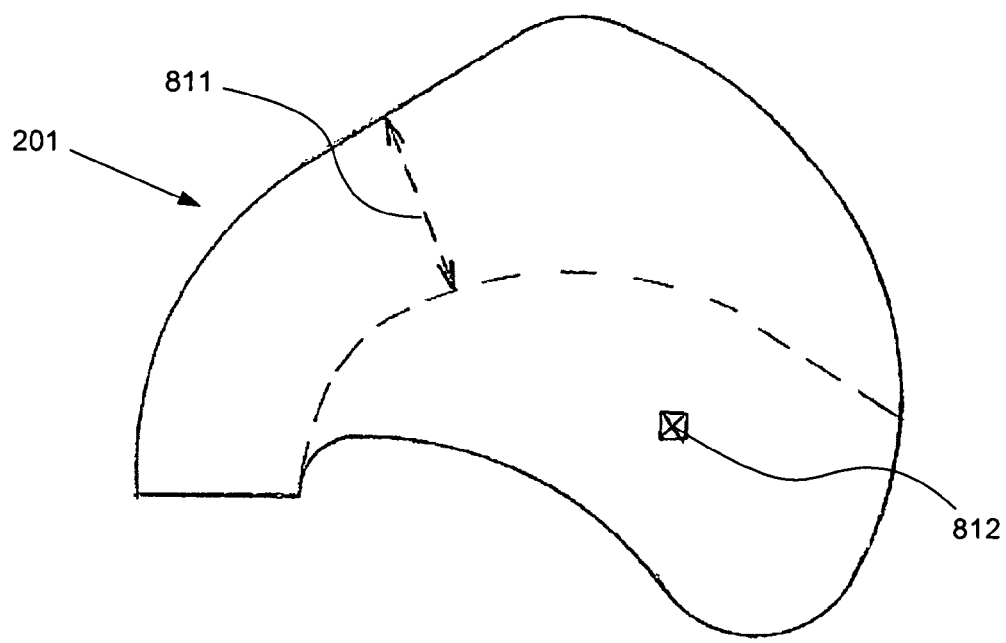
FIG. 10 is a side view of an alternative embodiment of a deployed airbag.

Referring to FIG. 10, a side view of an alternative embodiment of airbag 201 is illustrated in an inflated condition. An alternative embodiment of airbag 201 may be constructed using oblong-shaped geometry for both first lateral inboard panel 73 and second lateral inboard panel 63 and may include the use of vertical tether 811, and may include the use of horizontal tether 812 in two locations. Vertical tether 811, positioned between the base of the gap and the top of the airbag, provides additional support so that during inflation the base of the gap is restrained and airbag 201 takes and maintains the proper shape for improved deployment, especially in situations involving a rear facing infant seat (rfis) and an out of position occupant (oop). Horizontal tether 812 supports the lobe during inflation. Vertical tether 811 and horizontal tether 812 may provide support to aid proper deployment by restricting the volume of certain sections or locations of airbag 201. An alternative embodiment of airbag 201 may be constructed with zero or more than zero tethers. An alternative embodiment of airbag 201 may be constructed with tethers being internal or external to airbag 201.

Figure 11:
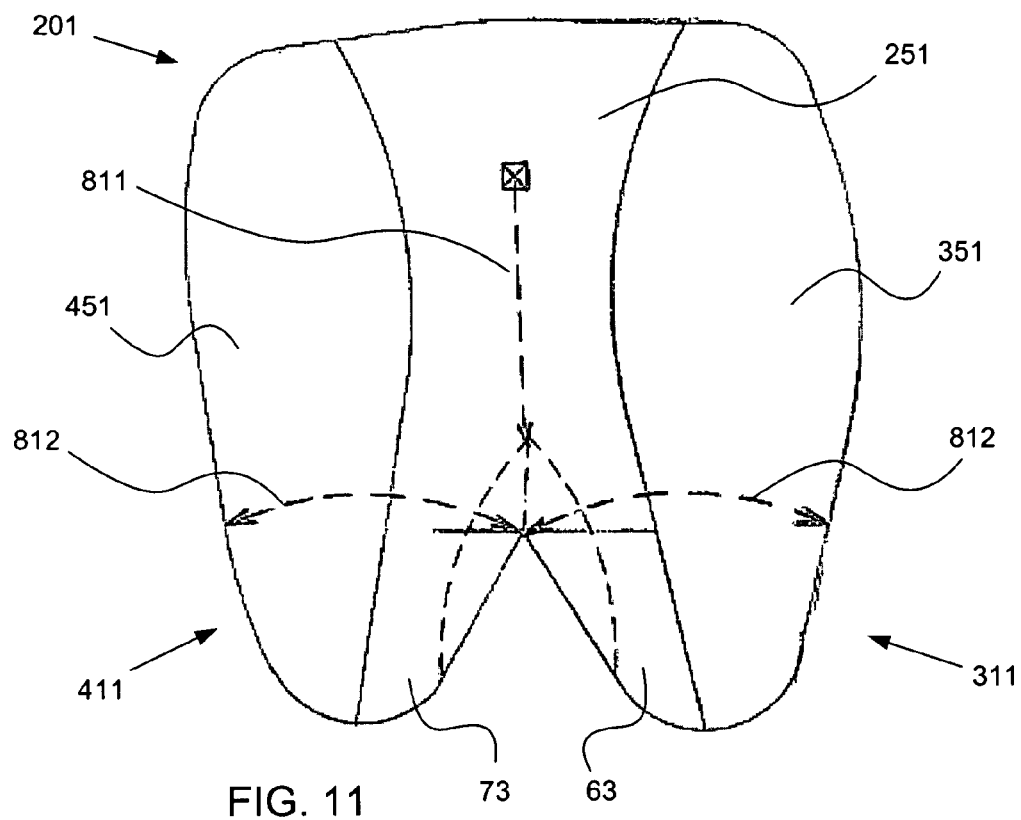
FIG. 11 is a front view of an alternative embodiment of a deployed airbag.

Referring to FIG. 11, a front view of an alternative embodiment of airbag 201 is illustrated in an inflated condition. An alternative embodiment of airbag 201 may comprise two lobes, first airbag cushion portion 411 and second airbag cushion portion 311. Alternative airbag 201 may further comprise vertical tether 811, positioned in airbag 201 between the base of the gap and the top of the airbag, and horizontal tether 812 in two locations, one positioned in right inflatable lobe 311 between inner panel 63 and outer panel 351, the other positioned in left inflatable lobe 411 between inner panel 73 and outer panel 451. First airbag cushion portion 411 includes an oblong-shaped first lateral inboard panel 73 coupled to first lateral outboard panel 451. Second airbag cushion portion 311 includes an oblong-shaped second lateral inboard panel 63 coupled to second lateral outboard panel 351. An alternative embodiment of airbag 201 may utilize additional tethers at one or more than locations and may be external or internal to airbag 201.

Figure 12:
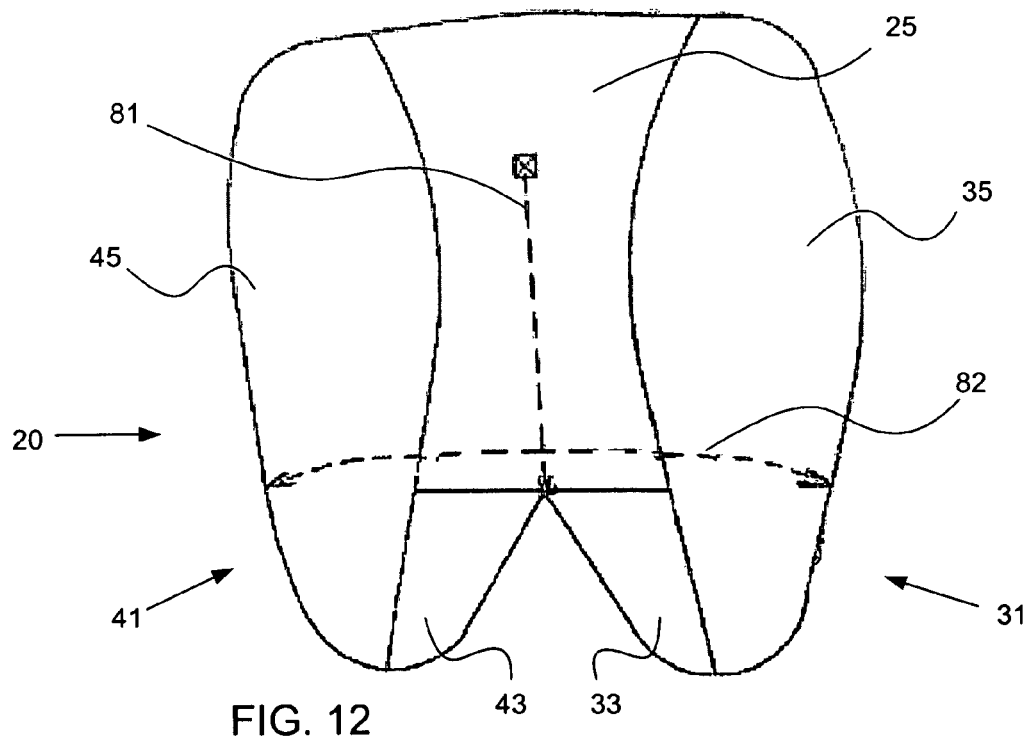
FIG. 12 is a front view of an alternative embodiment of a deployed airbag.

Referring to FIG. 12, a front view of an alternative embodiment of airbag 20 is illustrated in an inflated condition. An alternative embodiment of airbag 20 may include the use of vertical tether 81, positioned in the airbag between the base of the gap and the top of the airbag. An alternative airbag 20 may also include horizontal tether 82, positioned to run between the inside of outer panel 35 and the inside of outer panel 45 in a cross-car direction.

Figure 13:
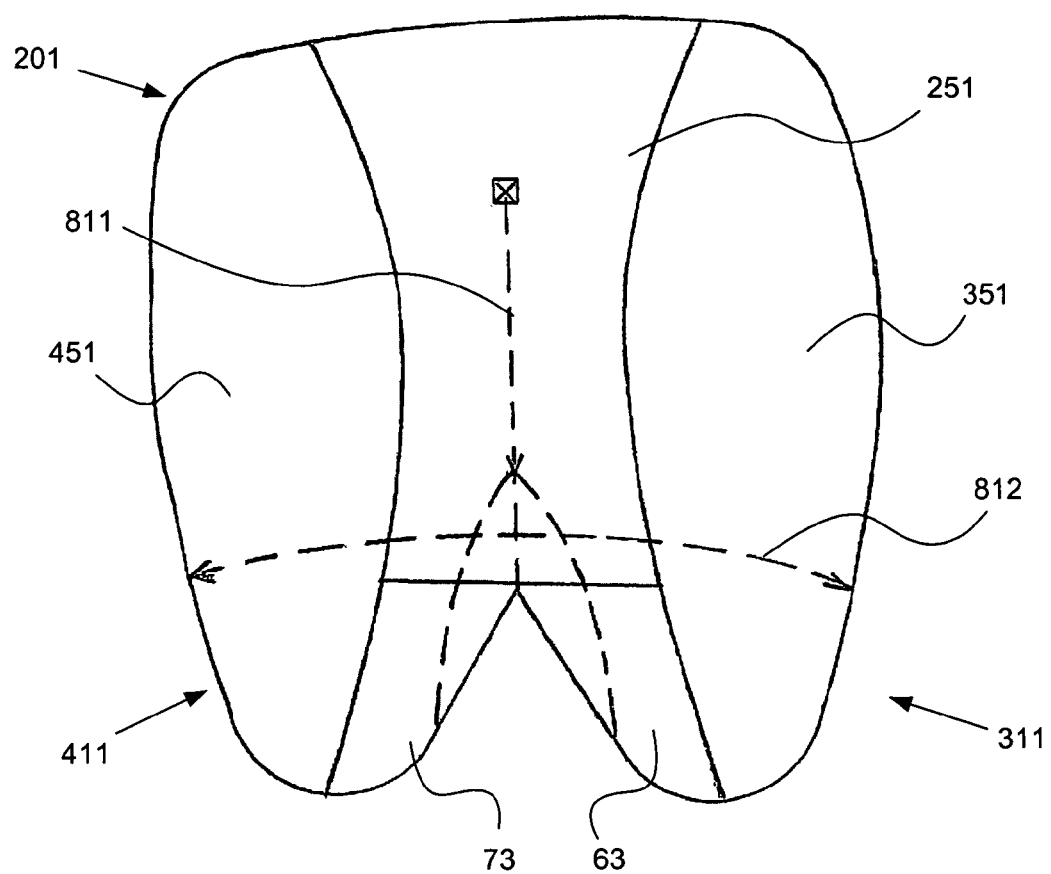
FIG. 13 is a front view of an alternative embodiment of a deployed airbag.

Referring to FIG. 13, a front view of an alternative embodiment of airbag 201 is illustrated in an inflated condition. An alternative embodiment of airbag 201 may include the use of vertical tether 811, positioned in the airbag between the base of the gap and the top of the airbag. An alternative airbag 201 may also include horizontal tether 812, positioned to run between the inside of outer panel 351 and the inside of outer panel 451 in a cross-car direction.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention.

What is claimed is:

1. An occupant protection apparatus for protecting a front seat passenger of a vehicle, wherein the protection apparatus includes an airbag module configured to be mounted in an instrument panel of a vehicle in front of the front seat passenger, wherein the module comprises an airbag and a gas generator, and the airbag includes a central panel and left and right inflatable lobes separated by a central gap;

wherein each of the inflatable lobes is bounded by an outer panel forming an outer surface of the lobe and an inner panel forming an inner surface of the lobe;

wherein a lower edge portion of each of the outer panels is connected to a lower edge portion of one of the inner panels;

wherein the inner panels face each other and are connected together along upper edge portions to define the central gap, wherein the central gap is positioned between lower portions of the left and right inflatable lobes; and wherein the central panel is connected to upper edge portions of the outer panels and is configured to extend to a leading-most end of the airbag when deployed.

2. The protection apparatus of claim 1, further comprising a lateral tether extending across one of the left and right inflatable lobes between the inner and outer panels.

3. The protection apparatus of claim 1, further comprising a substantially vertical tether positioned in the airbag between the gap and the gas generator.

4. The protection apparatus of claim 1, wherein each of the inner panels is oblong-shaped.

5. The protection apparatus of claim 1, wherein each of the inner panels is D-shaped.

6. An occupant protection apparatus comprising:
   an airbag including a pair of outer panels and a pair of inner panels;

wherein each of the outer and inner panels includes an upper edge portion and a lower edge portion;

wherein the upper edge portion of each of the outer panels is connected to a central panel spanning between the outer panels;

wherein the lower edge portion of each of the outer panels is connected to the lower edge portion of one of the inner panels;

wherein the upper edge portion of each of the inner panels is connected to the upper edge portion of the other inner panel and to the central panel to thereby form a downward facing central gap between the inner panel, and wherein the central panel is configured to extend to a leading-most end of the airbag when deployed.

7. The protection apparatus of claim 6, further comprising a lateral tether extending between the inner and outer panels.

8. The protection apparatus of claim 6, further comprising a vertical tether extending between the upper edge portions of the inner panels and the central panel.

9. The protection apparatus of claim 6, further comprising:
a first lateral tether positioned in a cross-car direction between one of the outer panels and the inner panel to which the one of the outer panels is connected.

10. The protection apparatus of claim 6, wherein each of the inner panels is oblong-shaped.

11. The protection apparatus of claim 6, wherein each of the inner panels is D-shaped.

* * * * *